United States Patent [19]

Waldschmitt

[11] Patent Number: 5,601,393
[45] Date of Patent: Feb. 11, 1997

[54] DUAL CAPACITY HOOK-LIFT HOIST

[75] Inventor: Thomas J. Waldschmitt, Ankeny, Iowa

[73] Assignee: Swaokiader U.S.A., Ltd., Des Moines, Iowa

[21] Appl. No.: 203,939

[22] Filed: Mar. 1, 1994

[51] Int. Cl.⁶ .................................................. B60P 1/48
[52] U.S. Cl. ...................... 414/498; 414/471; 414/491; 414/546
[58] Field of Search ........................ 414/471, 491, 414/494, 498, 546, 549

[56] References Cited

U.S. PATENT DOCUMENTS

| | | | |
|---|---|---|---|
| 3,874,537 | 4/1975 | Kou | 414/498 X |
| 3,892,323 | 7/1975 | Corompt | 414/491 |
| 3,964,625 | 6/1976 | Wirz | 414/471 |
| 4,053,074 | 10/1977 | Lemaire | 414/491 |
| 4,175,904 | 11/1979 | Airaksinen | 414/498 X |
| 4,204,793 | 5/1980 | Lemaire | 414/491 X |
| 4,265,463 | 5/1981 | Perruso | 414/563 X |
| 4,350,469 | 9/1982 | Corompt | 414/549 X |
| 4,470,747 | 9/1984 | Tichenor | 414/491 |
| 5,110,251 | 5/1992 | Gray | 414/545 |

FOREIGN PATENT DOCUMENTS

1636269  3/1991  U.S.S.R. ................. 414/491

*Primary Examiner*—James W. Keenan
*Attorney, Agent, or Firm*—Kent A. Herink, Esq.; Davis, Brown, Koehn, Shors & Roberts, P.C.

[57] ABSTRACT

A dual capacity hook-lift hoist mounted on a wheeled chassis for use in loading detached objects, such as containers, onto the chassis for transport to any location. The hook-lift hoist is also operable to tilt a loaded container to dump its contents. The hook-lift hoist includes at least one hydraulic cylinder that is sized to have a maximum loading capacity that is below the safe limit of the truck but which is capable of dumping a container that is at least equal to the carrying capacity of the chassis.

13 Claims, 8 Drawing Sheets

DUAL CAPACITY HOOK-LIFT HOIST

BACKGROUND OF THE INVENTION

The invention relates generally to hook-lift hoists mounted on a wheeled chassis and, more specifically, to a hook-lift hoist that has a lifting capacity that is less than its dumping capacity.

Hook-lift hoists have been in common use, particularly in European countries, for a number of years. The hoist has a pivotable L-shaped arm with a hook on its distal end portion that is used to engage a detachable truck box. The arm is pivoted to lift the box onto the chassis for transport of the box and its contents to any location.

It has become known also to provide the truck chassis with a lift mechanism for tilting of the box atop the chassis to dump the contents of the box rearwardly of the truck. Hook-lift hoists allow for a single truck chassis to be used with a wide variety of truck boxes, each of which has a distinct and advantageous use. A single truck chassis with a hook-lift hoist can be used, for example, to load, transport and dump open-topped waste receptacles to a disposal site; to load, transport, and unload shipping containers; to mount, use, and dismount road maintenance equipment, such as a salt spreader; to load, transport, and unload wheeled equipment; and so on. This functional versatility makes hook-lift hoists an economical vehicle for transport industries, particularly the street and highway maintenance departments of municipalities, states, and other governmental entities where budgetary constraints and the variety of tasks that must be performed make these multi-purpose vehicles an attractive choice.

Known hook-lift hoists have the limitation that the lifting capacity is the same as the carrying and dumping capacity of the vehicle. The lifting capacity, or loading capacity, of a hook-life hoist is the weight of the heaviest object the hoist can move from a detached ground-supported position to a loaded position on the truck chassis. The lifting or loading capacity of a chassis is the heaviest object the chassis can load without the front wheels of the chassis becoming unloaded. The carrying capacity of the vehicle is the maximum weight that can loaded on the vehicle and still have the vehicle remain safe to transport the loaded weight. The dumping capacity of the vehicle is the weight of the heaviest object which the hoist lift can tilt to an off-loading position. Because the maximum amount a truck can lift may be less than the maximum amount it can carry and dump, particularly for short wheelbase, maneuverable trucks, the capabilities and usefulness of these hook-lift hoists is diminished. For a given size, weight, and horsepower of truck, its carrying and dumping capacities are not fully utilized. This excess capacity reduces the economy of these single capacity hook-lift hoists.

SUMMARY OF THE INVENTION

In accordance with the present invention, a dual capacity hook-lift hoist is provided wherein the full lift capabilities of the hoist are exploited together with maximizing the carrying and dumping capabilities of the hoist and the truck on which it is mounted. The hoist includes a hook lift arm that has three segments, an inner segment, a middle segment, and a jib segment or member. The inner segment is mounted at the rear end portion of the truck chassis for pivotable movement at a first end thereof about a horizontal axis transverse to the truck chassis. The middle segment is mounted on the second, opposite end of the inner segment for pivotable movement also about a horizontal transverse axis. The jib member extends at a right angle from the middle segment and terminates at its free end portion with a hook for releasably grasping containers and the like. In the preferred embodiment, the jib member telescopes relative to the middle segment and can be extended and retracted by a hydraulic cylinder.

A pair of hydraulic cylinders are connected between a forward portion of a mainframe of the hoist and a point on either side of the middle segment. When the middle segment is free to pivot relative to the inner segment, extension and retraction of the cylinders moves the hook lift arm between its transport or loaded position and a hook-up position. To tilt a container loaded on the truck to dump its contents, the inner and middle segments are secured in a linear relationship. Extension of the cylinders causes the hook lift arm to pivot only about the first end of the inner segment thereby pivoting a container loaded on the truck about the horizontal transverse axis at the rear of the truck chassis.

A pressure relief valve in the hydraulic supply system for controlling the extension and retraction of the hydraulic cylinders limits the maximum extension and retraction force that can be imposed by the cylinders. In the lift cycle, the pressure relief valve, in combination with the size of the hydraulic cylinders, the articulation points of the hook-lift arm, and the wheelbase length of the truck, prevent the hook-lift hoist from attempting to load an object having a weight that would destabilize the truck. The same pressure relief valve, again in combination with the hook-lift hoist geometries, permits an object to be tilted for dumping that is of weight that exceeds that which could be loaded on the truck by the hook-lift hoist but which is within the carrying capacity of the truck.

In an alternative embodiment, a hook-lift hoist of conventional design is provided with a pair of pressure relief valves. The first pressure relief valve is active during the loading cycle of the hook-lift hoist and is sized to prevent the attempted loading of unsafe or destabilizing weights. The second pressure relief valve is active during the dumping cycle to permit dumping of weights up to the carrying capacity of the truck.

Accordingly, an object of the invention is to provide a hook-lift hoist that has a lifting capacity that is less than its carrying and dumping capacities.

Another object of the invention is to provide a hook-lift hoist wherein the geometry of the hook-lift hoist, in cooperation with the sizing of the hydraulic cylinders, exhibits a lifting capacity that is less than the dumping capacity for the same hydraulic fluid supply system.

A further object of the invention is to provide a hook-lift hoist wherein a hydraulic fluid supply system includes a first pressure relief valve for limiting the loading capacity of the hoist and a second, higher-limit pressure relief valve for limiting the dumping capacity of the hoist.

These and other objects of the invention will be understood by a person skilled in the art upon a review of the specification, the associated drawings, and the appended claims.

BRIEF DESCRIPTION OF THE DRAWINGS

FIGS. 6a–6j are side views of the hook-lift hoist showing in sequence the loading and dumping of a container.

DETAILED DESCRIPTION OF THE PREFERRED EMBODIMENT

Figure 1:
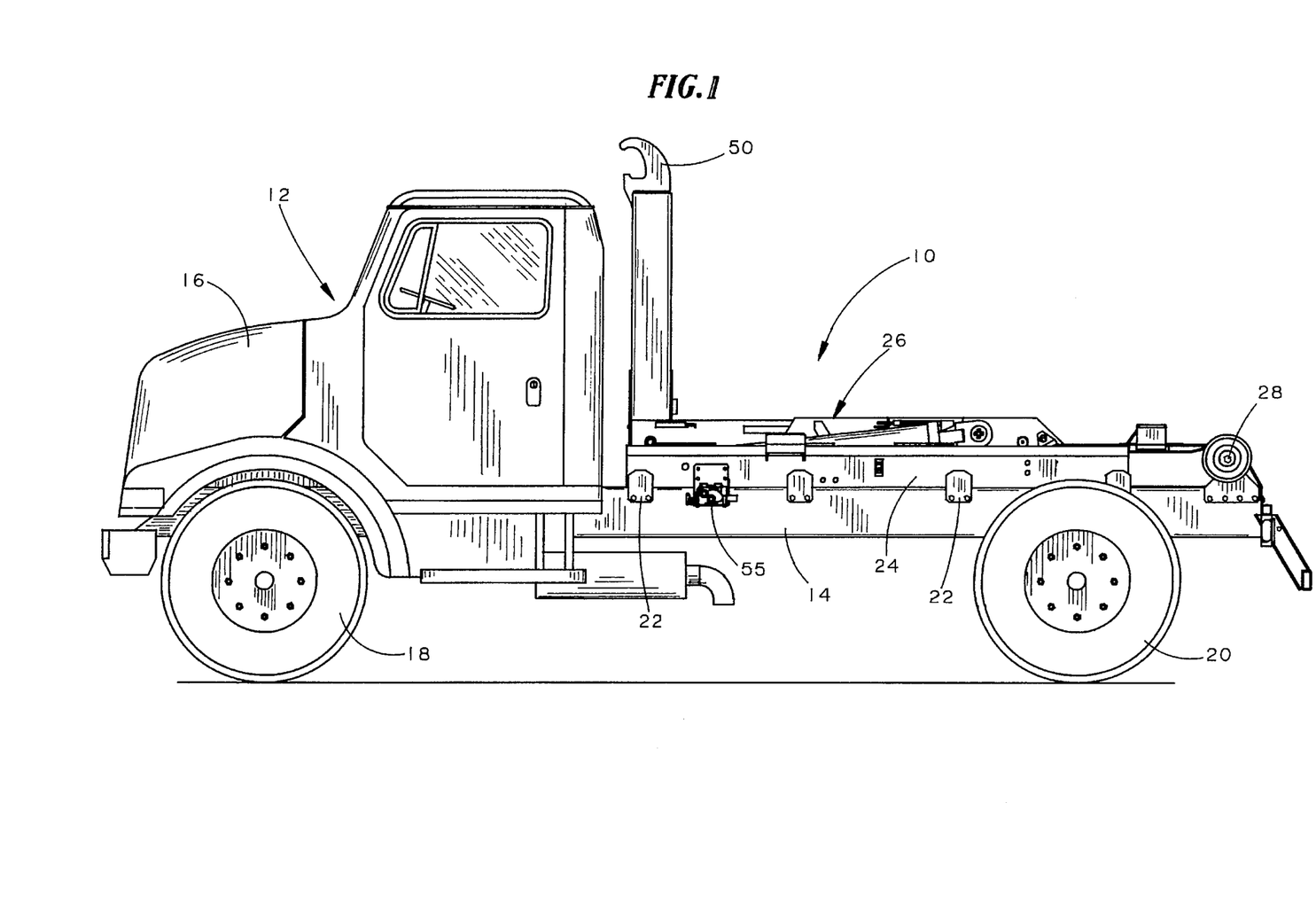
FIG. 1 is a side view of a hook-lift hoist of the present invention including an associated truck.

Illustrated in FIG. 1, generally at 10, is a dual capacity hook-lift hoist of the present invention that is mounted a truck 12 having a chassis 14 and cab 16 supported on front wheels 18 and rear wheels 20. As illustrated in FIGS. 6a–6j, the hook-lift hoist 10 is used to load and unload objects on the truck 12 and, if desired, to tilt the loaded object for dumping of its contents.

The hook-lift hoist 10 includes a mainframe 24 that is secured to the chassis 14 rearwardly of the cab 16 by a plurality of mounting plates 22 (FIG. 1). An articulated hook-lift arm 26 is mounted to the mainframe 24 for pivotal movement about a horizontal axis, indicated at 28, transverse to the truck 12 (FIG. 6). The hook-lift arm 26 (FIG. 2) has three main components, an inner or base segment 30, a middle segment 32, and a jib member 34. The inner segment 30 includes a frame having a pair of parallel side arms 36a and 36b that interconnect the inner segment 30 to the mainframe 24 for pivotal movement about the aforementioned horizontal transverse axis defined by a pair of pins 38a and 38b that are journaled in the mainframe 24. Included in the middle segment 32 are a pair of mounting arms 40a and 40b secured to either side of a central square tube 42. The rearward end portions of the mounting arms 40a and 40b pivotally interconnect the middle segment 32 to the inner segment 30 for pivotal movement about a second, horizontal and transverse axis defined by pins 44a and 44b.

Figure 2:
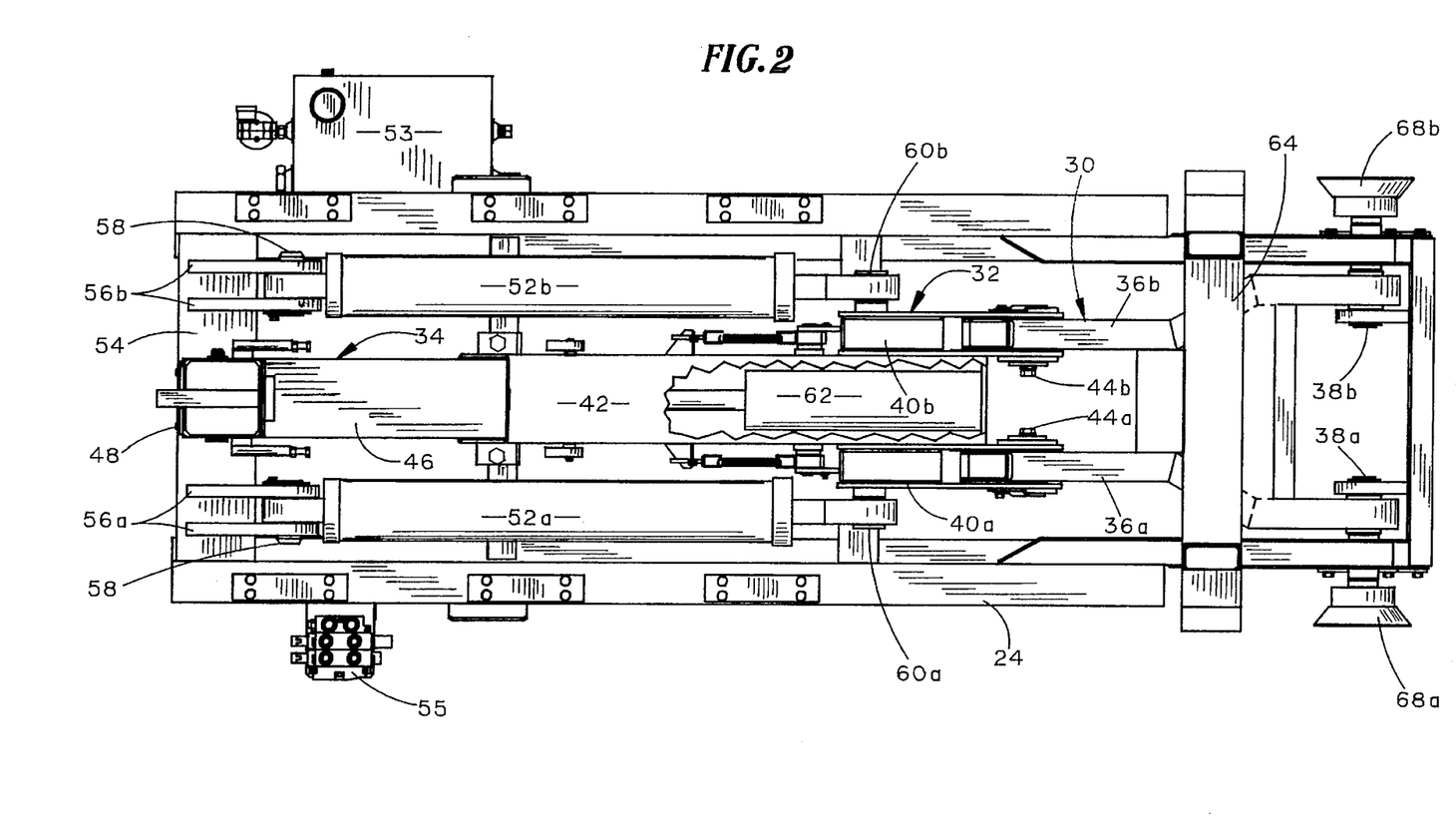
FIG. 2 is a plan view of a portion of the hook-lift hoist mounted on the bed of a truck chassis.
Figure 3:
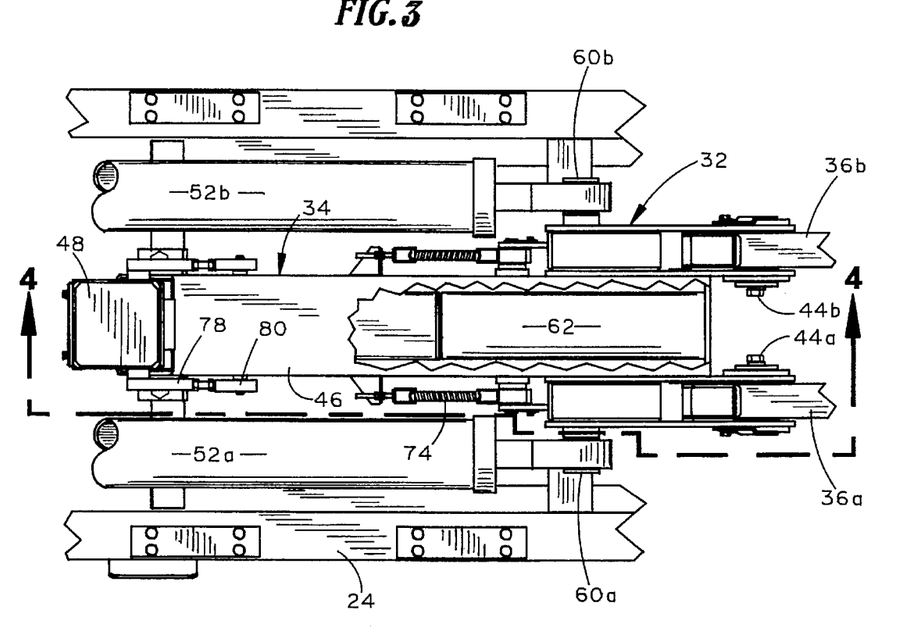
FIG. 3 is a partial plan view of the hook-lift hoist.

The jib member 34 is L-shaped in longitudinal cross-section, having first and second leg sections. The first leg section is a square tube 46 that is received for telescoping movement inside the central square tube 42 of the middle segment 32. The second leg section is also a square tube 48 that extends perpendicularly from the square tube 46. At the free or distal end portion of the jib member 34 is a hook 50.

Telescoping movement of the square tube 46 of the jib member 32 inside the central square tube 42 of the middle segment 32 is achieved by a jib hydraulic cylinder 62 positioned inside the nested tubes. The stationary or cylinder end of the jib hydraulic cylinder 62 is anchored in the middle segment 32 and the piston or movable end is anchored to the jib member 34 so that extension and retraction of the jib hydraulic cylinder 62 will telescope outwardly and inwardly, respectively, the jib member 34 relative to the middle segment 32.

The hook-lift arm 26 is pivoted by a pair of hydraulic cylinders 52a and 52b (FIG. 2) that are supplied with pressurized hydraulic fluid by a hydraulic fluid supply system including a hydraulic pump 53 and valve station 55. Each of the cylinders 52a and 52b is pivotally connected to a forward cross bar 54 of the mainframe 24 by a pair of mounting ears 56a and 56b and associated pins 58 for coordinated pivotal movement about a horizontal transverse axis centered on the pins 58. The rearward or moveable end portion of the cylinders 52a and 52b are pivotally secured to the mounting arms 40a and 40b, respectively, of the middle segment 32 by a corresponding one of a pair of posts 60a and 60b.

Figure 6A:
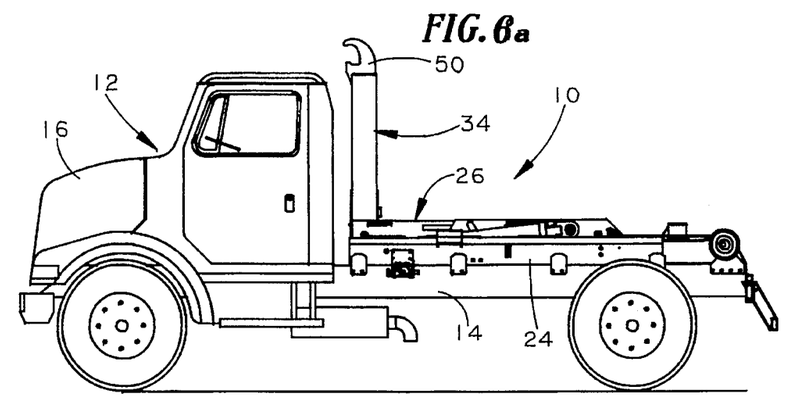
Figure 6B:
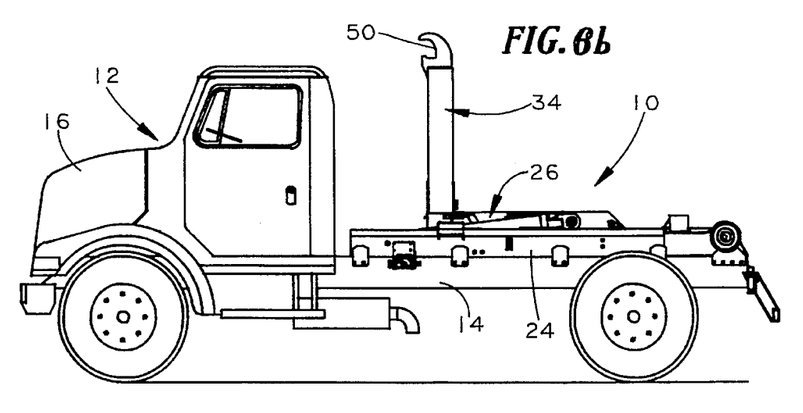
Figure 6C:
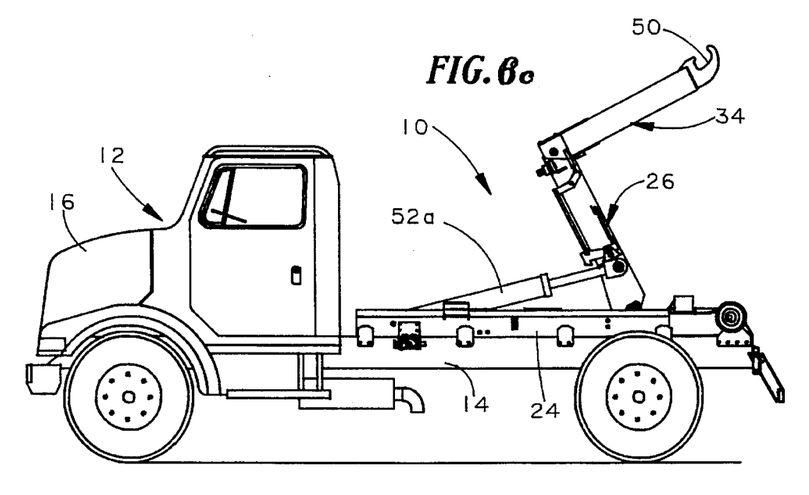
Figure 6D:
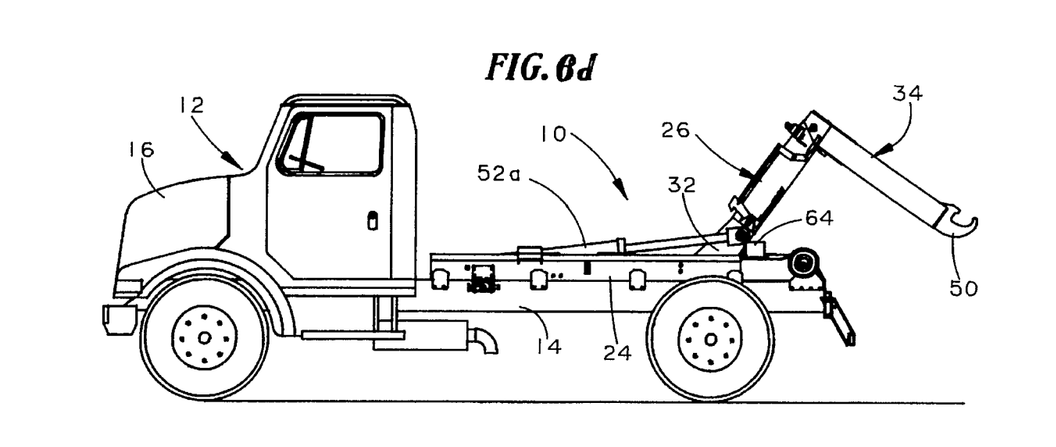

As illustrated in FIGS. 6a–6i at the initiation of the loading cycle, the hook-lift arm 26 is supported on the mainframe 24 (FIG. 6a). The cylinder 62 (FIG. 2) is extended so that the jib member 34 is adjacent the cab 16. From this transport position, the jib member 34 is moved rearwardly by retraction of the jib cylinder 62 (FIG. 6b). The cylinders 52a and 52b are extended to pivot the middle segment 32 and the support jib member 34 relative to the inner segment 30 (FIG. 6c). Additional extension of the cylinders 52a and 52b will pivot the middle segment 32 into contact with a cross bar 64 that is supported on the frame of the inner member 30 (FIG. 6d). As the cylinders 52a and 52b extend further, with the middle segment 32 in contact with the cross bar 64, the hook-lift arm 26 now pivots at the rearward or inner end portion of the inner member 30 about the axis 28 (FIG. 6e). At full extension of the cylinders 52a and 52b, the hook 50 is positioned below the mainframe 24 in a hooking position for engagement with a ground-supported object to be loaded on the truck 12, such as a container 66.

Figure 6F:
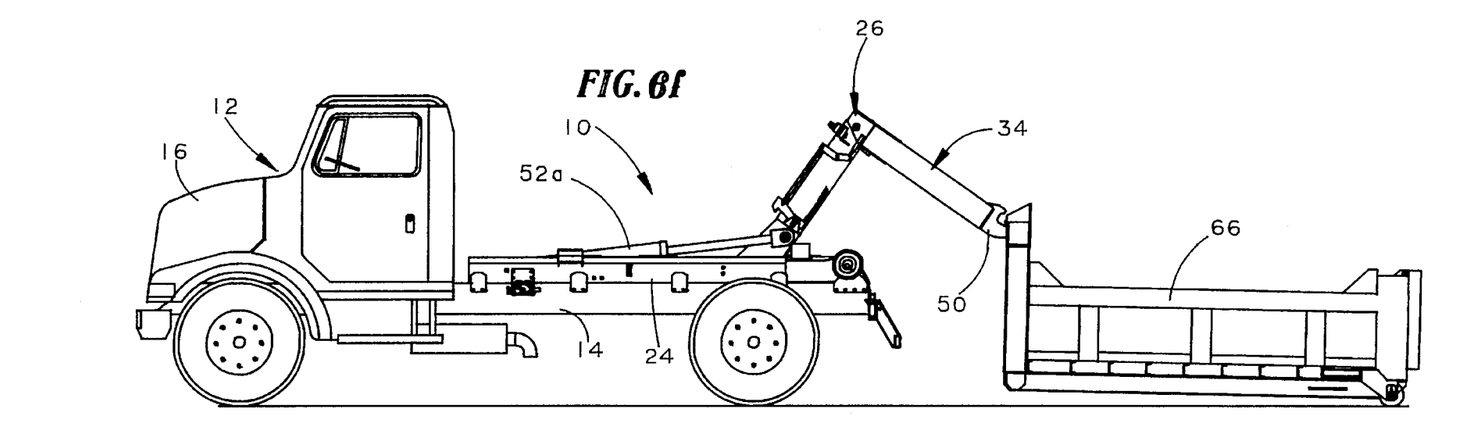
Figure 6G:
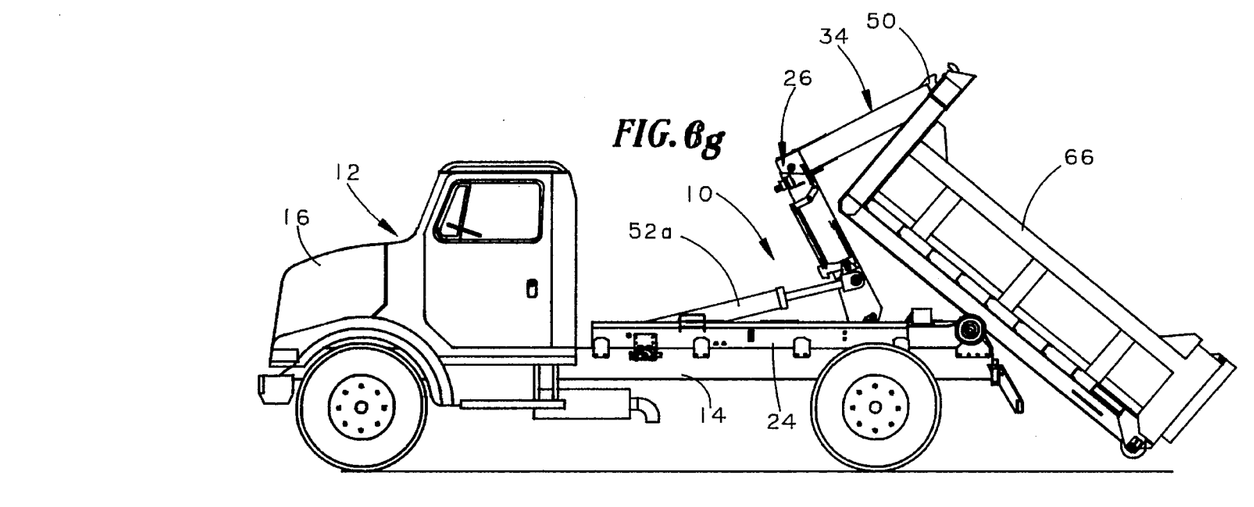
Figure 6H:
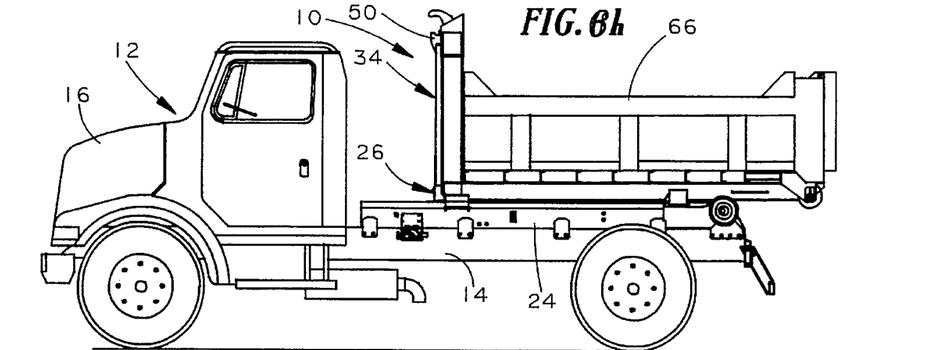
Figure 6I:
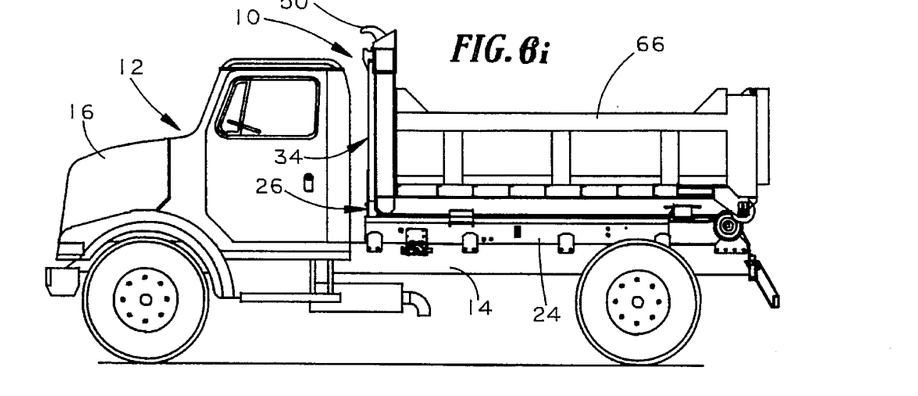

Upon engagement of the container 66 with the hook 50, the cylinders 52a and 52b are retracted to pivot the hook-lift arm 26 upwardly and forwardly, raising the forward end of the container 66 off the ground and drawing the container 66 closer to the truck 12 (FIG. 6f). Continued retraction of the cylinders 52a and 52b raises the forward end portion of the container above the rearward end portion of the truck 12 whereupon the bottom of the container 66 will be brought into contact with a pair of flanged rollers 68a and 68b which serve to decrease the force required to drag the container 66 onto the truck 12 and to keep it centered relative to the truck 12 (FIG. 6g). Full retraction of the cylinders 52a and 52b bring the hook-lift arm 26 to the same, earlier described position of FIG. 6b where it and the container 66 are supported on the mainframe 24 (FIG. 6h). The jib cylinder 62 is then extended to move the container 66 horizontally forwardly to a storage and transport position (FIG. 6i). It will be appreciated that the sequence just described is reversed to unload a container 66 that has been previously loaded on the truck 12.

During the loading cycle, the weight of the container 66 and its contents is carried by the hook-lift arm 26 and the rollers 68. Accordingly, a moment is created about the rear wheels 20 that acts to unweight the front wheels 18. For a given hook-lift hoist geometry, the shorter the wheelbase length of the truck 12, the lower the weight that can be loaded without unweighting the front wheels 18 below a safe limit. In the preferred embodiment, pressure relief valve 55 is provided in the pressurized fluid supply lines for the cylinders 52a and 52b. The release pressure of the valve 55 is selected in correspondence to the geometry of the hook-lift hoist 10, the capacity of the cylinders 52a and 52b, and the size and weight of the truck 12 so that the maximum loading capacity cannot be exceeded.

Figure 4:
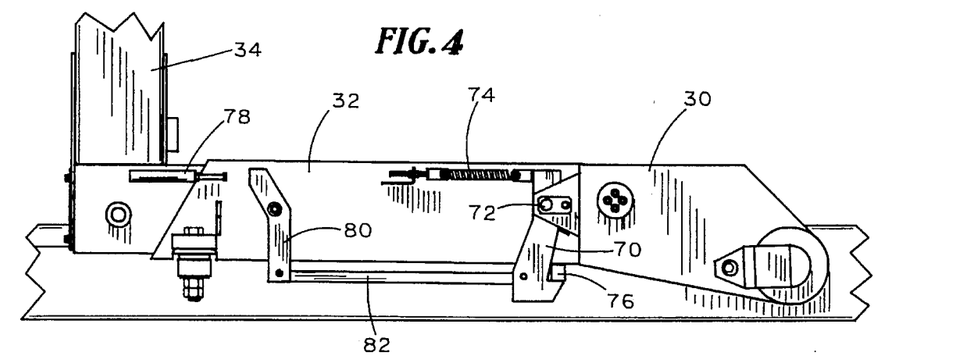
FIG. 4 is an enlarged, detail side view of the hook lift arm in an extended and locked position taken along line 4—4 of FIG. 3
Figure 5:
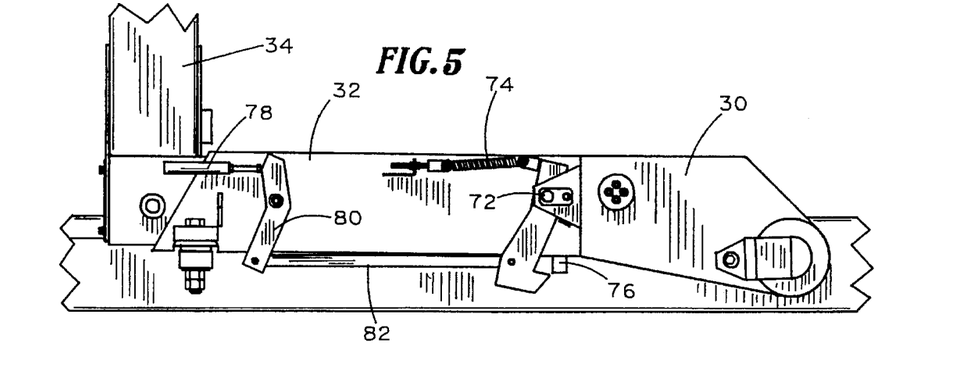
FIG. 5 is an enlarged, detail side view of the hook-lift arm in a retracted and unlocked position.
Figure 6J:
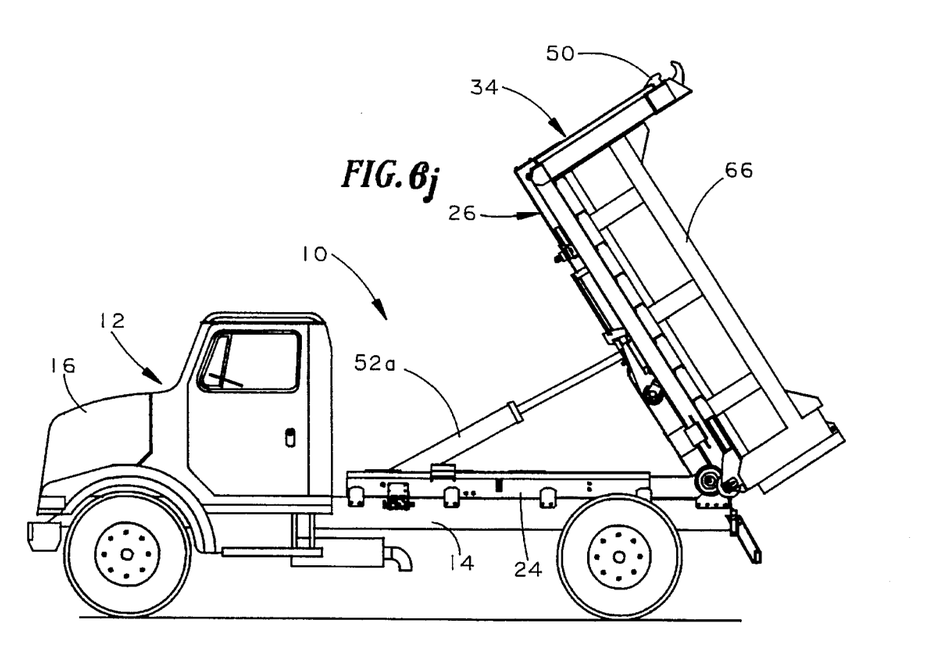

To provide for tilting of the loaded container 66, for example to dump its contents, the middle segment 32 is releasably secured in alignment with the inner segment 30 and the assembly is then pivoted about axis 28 by extension of the cylinders 52a and 52b (FIG. 6j). A releasable latch mechanism is mounted on either side of the middle segment 32, one of which is illustrated in FIGS. 4 and 5, the other being identical in construction. A latch arm 70 is mounted for pivotal movement about an axis at 72 and is biased to its latched position (FIG. 4) by an extension spring 74. In the latched position, the latch arm engages a lift bar 76 that is secured to the inner member 30. When latched, extension of the cylinders 52a and 52b will pivot not only the middle segment 32 but also the latched inner member 30 so that the hook-lift arm 26 pivots at the rearward or inner end portion of the inner segment 30 about axis 28.

The latch arm 70 is moved from its latched position to an unlatched position upon retraction of the jib member 34 relative the middle segment 32. A pusher finger 78 mounted on the jib member 34 contacts and pivots a release arm 80 that is interconnected with the latch arm 70 by a rod 82 (FIG. 5). Movement of the release arm 80 by the pusher finger 78 upon retraction of the jib member 34 accordingly, automatically releases the latch mechanism to permit pivotal movement between the middle member 32 and the inner member 30 as required in the loading/unloading cycle.

In general, the shorter the wheelbase of the truck, the more maneuverable and versatile the truck. For this reason, trucks having the shortest wheelbase satisfactory for the task are preferred. As discussed previously, however, the maximum safe loading capacity of a hook-lift hoist is inversely related to the wheelbase. For trucks in common use for transporting loads suitable for handling by a hook-lift hoist, the wheelbase (or axle-to-cab ratio) is often such that the maximum safe loading capacity is substantially less than the maximum safe carrying capacity of the truck. In accommodating the limitations in loading capacity, the prior art hook-lift hoists had dumping capacities that were restricted to the maximum safe loading capacity. The carrying capacity of the trucks and the dumping capacity of the associated hook-lift hoists, accordingly, were not fully utilized.

Figure 7A:
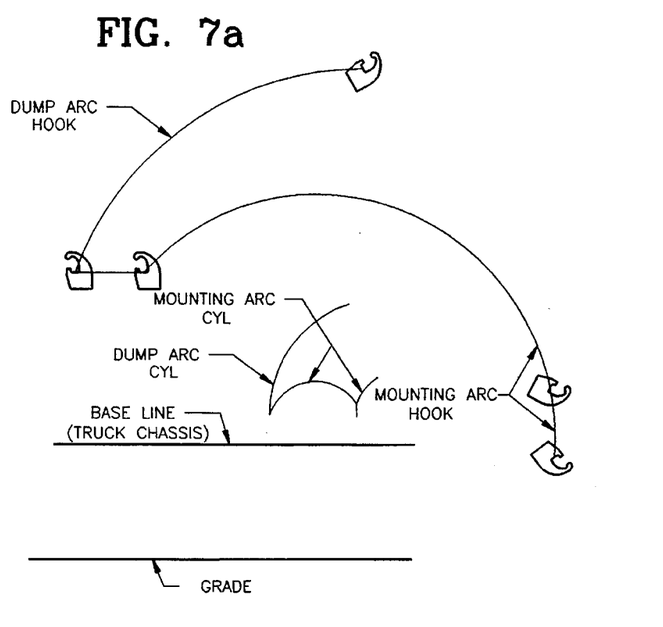
FIGS. 7a–7b is a schematic diagrams of the geometry of a hook-lift hoist of the present invention.
Figure 7B:
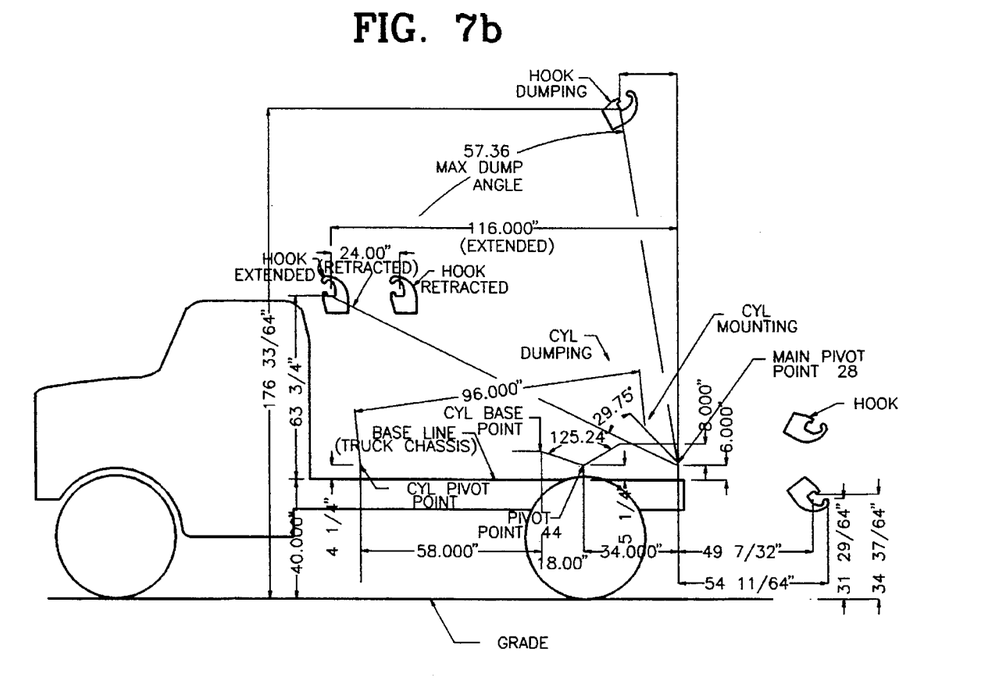

In the present invention, the geometry of the hook-lift hoist, as illustrated in FIG. 7b, has been set in relation to the size of the main hydraulic cylinders 52a and 52b and the wheelbase length of typical trucks. In the preferred embodiment illustrated in FIG. 7b, the cylinders 52a and 52b each have a piston diameter of 5½ inches, a rod diameter of 2½ inches, and a maximum extension force of 66,500 pounds at 2800 p.s.i. and a maximum retraction force of 52,800 pounds at 2800 p.s.i. The pressure relief valve dumps back to reservoir pressures in excess of 2800 p.s.i., and the maximum ratio pressure of the cylinders 52a and 52b is 3000 p.s.i. The preferred embodiment hook-lift hoist is appropriate for use with trucks having a net vehicle weight of 6000 pounds or more and a wheelbase of between 152 and 170 inches. The hoist described in the preferred embodiment weighs approximately 3000 pounds. The resulting dual capacity hook-lift hoist has a loading capacity of 18,000 lbs. and a dumping capacity of 24,000 lbs.

In the preferred embodiment of the present invention, the horizontal distance from the center of the rearward pair of pins 38a and 38b to the center of the for forward pair of pins 58 is one-hundred and nine inches (FIGS. 2 and 7). The center point of the rearward pair of pins 38a and 38b is six inches from the lowermost portion of the mainframe 24. The center point of the forward pair of pins 58 is four and one quarter inches from the lowermost portion of the mainframe 24. When the cylinders 52a and 52b are fully retracted, the horizontal distance between the forward pair of pins 58 and the posts 60a and 60b which secure the cylinders 52a and 52b to the mounting arms 40a and 40b, is fifty-nine inches. The jib member 34 pivots on the pins 44a and 44b which are located five and one-quarter inches above the lowermost portion of the mainframe 24, thirty-four inches from the rearward pair of pins 38a and 38b, and seventy-five inches from the forward pair of pins 58.

When fully extended, the point at which the hook 50 contacts the container 66 is one hundred and eighteen inches horizontal of the rearward pair of pins 38a and 38b, and sixty-three and three quarters vertical inches from the lowermost portion of the mainframe 24 (FIGS. 2, 6 and 7). Preferably, the lowermost portion of the mainframe 24 is forty inches above ground when placed on the truck 12. This places the contact point of the hook 50 one hundred and three and three quarters inches above the ground when the hook 50 is in the transportation position shown in FIG. 6i.

When the hook 50 is retracted by the jib hydraulic cylinder 62, the hook 50 moves horizontally twenty-four inches (FIGS. 2 and 7). When dumping, the maximum height which the contact point of the hook 50 reaches from the lowermost portion of the mainframe 24 is one hundred thirty-six and thirty-three sixty-fourths inches, placing the contact point of the hook 50 one hundred and seventy-six and thirty-three sixty-fourths inches above the ground when the hook-lift hoist 10 is positioned on the truck 12. Preferably the maximum dump angle is fifty-six degrees and thirty-six minutes and is achieved by extending the cylinders 52a and 52b to a length of ninety-eight inches. When loading and unloading the container 66, the hook 50 and cylinders 52a and 52b move through the arcuate paths shown in FIG. 7. When loading the container 66, the contact point of the hook 50 is located forty-nine and seven thirty-seconds inches horizontally of the center point of the pins 38a and 38b. Similarly, the lift portion of the hook 50 is located fifty-four and eleven sixty-fourths inches horizontally of the pins 38a and 38b. When loaded on the truck 12 and in its lowermost position, the securement portion of the hook 50 is located thirty-four and thirty-seven sixty-fourths inches above the ground, while a tip of the hook 50 is located thirty-one and twenty-nine sixty-fourths inches above the ground. In the preferred embodiment, the design constraints were selected to provide a dual capacity hook-lift hoist that maximizes the loading and dumping capacities for a single pair of hydraulic cylinders that are fully utilized in both the loading and dumping cycles. It has the added advantage of needing only a single pressure relief valve 55 to protect both the loading and dumping operations, and is thus simple and inexpensive to manufacture and maintain. While the preferred embodiment of the present invention is described above in detail, it should be noted that differing geometries may be utilized to maximize the loading and dumping capacities for trucks and hook-lift hoists of varying sizes and dimensions.

Dual capacity can also be obtained in conventional hook-lift hoists by using a separate pressure relief valve for each of the loading and dumping cycles. A loading cycle pressure relief valve with a lower limit will prevent an operator from attempting load an unsafe weight while a higher limit relief valve will permit dumping of loads up to the carrying capacity of the truck.

Although the invention has been described with respect to a preferred embodiment thereof, it is to be also understood that it is not to be so limited since changes and modifications can be made therein which are within the full intended scope of this invention as defined by the appended claims.

I claim:

1. In a hook-lift hoist mounted on a wheeled chassis having front wheels and including at least one hydraulic cylinder for loading a detached object onto said chassis and for tilting said loaded object to a raised off-loading position, wherein said chassis has a maximum carrying capacity, wherein said chassis has a maximum loading capacity before said front wheels become unloaded, wherein said chassis-mounted hook-lift hoist has a maximum loading capacity, and wherein said chassis-mounted hook-lift hoist has a maximum dumping capacity, the improvement comprising pressure relief means for limiting said loading capacity of said chassis-mounted hook-lift hoist below said maximum loading capacity of said chassis and for limiting said dumping capacity of said chassis-mounted hook-lift hoist above said maximum loading capacity of said chassis and up to approximately said carrying capacity of said chassis.

2. A hook-lift hoist as defined in claim 1, wherein said pressure relief means includes a single pressure relief valve.

3. In a hook-lift hoist mounted on a wheeled chassis having front and rear wheels for loading a detached object onto a bed on the chassis and for tilting said bed between a substantially horizontal transport position and a raised off-loading position, said hook-lift hoist including an articulated hook-lift arm mounted to said chassis for pivotal movement about a horizontal axis transverse to the chassis and rearwardly of said rear wheels, and including a supply of hydraulic fluid at a pressure up to but not exceeding a preestablished limit, wherein said articulated hook-lift arm is adjustable to a rigid, non-articulated condition, the improvement comprising hydraulic cylinder means for pivoting said articulated hook-lift arm during loading of said detached object in response to said supply of pressurized hydraulic fluid up to said limit and for pivoting said hook-lift arm in said rigid, non-articulated condition during tilting of said loaded object in response to said supply of pressurized hydraulic fluid up to said limit, and wherein the maximum weight of said loaded object that can be tilted from said transport position to said off-loading position by said hydraulic cylinder means at said pressure limit substantially exceeds the maximum weight of said detached object that can be loaded onto the chassis at said pressure limit.

4. A hook-lift hoist according to claim 3, wherein said chassis has a maximum rated carrying capacity and said maximum weight of said loaded object that can be tilted is at least equal to said carrying capacity.

5. A hook-lift hoist according to claim 3, wherein said maximum weight of said detached object that can be loaded onto said chassis is not greater than a weight that would unload said front wheels of said vehicle.

6. A hook-lift hoist according to claim 3, wherein said hydraulic cylinder means includes a pair of matched hydraulic cylinders positioned on either side of said hook-lift arm.

7. A hook-lift hoist according to claim 3, wherein said hook-lift arm includes a jib member that is extendible to increase the length of said hook-lift arm.

8. A hook-lift hoist mounted on a wheeled chassis having a longitudinal axis and including at least one hydraulic cylinder for loading a detached object onto said chassis and for tilting an object loaded onto said chassis, the hoist comprising:

a. a hook lift arm having an inner segment having a first end and a second end opposite said first end, a middle segment having a first end and a second end opposite said first end, and a jib segment having a first end and a free end opposite said first end; said inner segment is mounted at a rear end portion of said chassis for pivotal movement at said first end of said inner segment about a first horizontal axis transverse to said longitudinal axis, said middle segment is mounted on said second end of said inner segment, for pivotal movement about a second axis parallel to said first axis, said jib member extends at approximately a right angle from said second end of said middle segment and terminates at its free end with a hook for releasably grasping said detached object, said hook lift arm having an articulated condition wherein said middle segment is free to pivot relative to said inner segment, and said hook lift arm having a non-articulated condition wherein said inner segment and said middle segment are secured in linear alignment;

b. hydraulic means connected between a forward portion of said chassis and a point on said middle segment, said hydraulic means having at least one hydraulic cylinder, wherein when said hydraulic means is extended or retracted while said hook lift arm is in said articulated condition, said hydraulic means moves said hook lift arm between a transport position and a hook-up position, and wherein when said hydraulic means is extended or retracted while said hook lift arm is in said non-articulated condition said hydraulic means moves said hook lift arm between a horizontal position and a raised off-loading position; and c. pressure relief means for limiting the maximum extension and retraction forces that can be imposed by said hydraulic means, said pressure relief means being such that said hydraulic means is prevented from moving said hook lift arm from said hooking position to said transport position when an object weighing more than a maximum loading weight is attached to said hook, said pressure relief means being such that said hydraulic means can move said hook lift arm from said horizontal position to said raised off-loading position when an object weighing less than a maximum dumping weight is attached to said hook, and wherein said maximum dumping weight is substantially greater than said maximum loading weight.

9. The hook-lift hoist in claim 8, wherein said pressure relief means includes single pressure relief valve.

10. The hook-lift hoist in claim 8, wherein said chassis has a maximum rated carrying capacity and said maximum dumping weight is at least equal to said carrying capacity.

11. The hook-lift hoist in claim 8, wherein said maximum loading weight is less than a weight that would unload said front wheels of said vehicle.

12. The hook-lift hoist in claim 8, wherein said hydraulic means includes a pair of matched hydraulic cylinders positioned on either side of said hook-lift arm.

13. The hook-lift hoist in claim 8, wherein said hook-lift arm is extendible to increase the length of said hook lift arm.

* * * * *

UNITED STATES PATENT AND TRADEMARK OFFICE
CERTIFICATE OF CORRECTION

PATENT NO. : 5,601,393
DATED : February 11, 1997
INVENTOR(S) : Thomas J. Waldschmitt It is certified that error appears in the above-indentified patent and that said Letters Patent is hereby corrected as shown below:

On the Title page, item [73] Assignee: of the Patent, change "Swaokiader" to "- Swaploader --.

Signed and Sealed this

Twenty-seventh Day of May, 1997

BRUCE LEHMAN

Attest:

Attesting Officer

Commissioner of Patents and Trademarks